United States Patent
Chun et al.

(10) Patent No.: US 8,259,627 B2
(45) Date of Patent: Sep. 4, 2012

(54) METHOD AND APPARATUS OF COMPOSING UPLINK CONTROL CHANNEL IN WIRELESS COMMUNICATION SYSTEM

(75) Inventors: Jin Young Chun, Anyang-si (KR); Sunam Kim, Anyang-si (KR); Hyunsoo Ko, Anyang-si (KR); Bin Chul Ihm, Anyang-si (KR); Seunghyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 12/656,611

(22) Filed: Feb. 4, 2010

(65) Prior Publication Data

US 2010/0208669 A1    Aug. 19, 2010

Related U.S. Application Data

(60) Provisional application No. 61/150,306, filed on Feb. 5, 2009, provisional application No. 61/151,524, filed on Feb. 11, 2009.

(30) Foreign Application Priority Data

Aug. 13, 2009  (KR) .................. 10-2009-0074630

(51) Int. Cl.
*H04J 1/16* (2006.01)
*H04L 12/56* (2006.01)

(52) U.S. Cl. ......... 370/278; 370/252; 370/329; 370/400

(58) Field of Classification Search .................. 370/252, 370/329, 430, 278
See application file for complete search history.

(56) References Cited

U.S. PATENT DOCUMENTS

| 2004/0203980 | A1 | 10/2004 | Das et al. |
| 2005/0276266 | A1 | 12/2005 | Terry |
| 2008/0095106 | A1* | 4/2008 | Malladi et al. ................ 370/329 |
| 2010/0091798 | A1* | 4/2010 | Bhushan et al. ............. 370/474 |

FOREIGN PATENT DOCUMENTS

EP    1764943 A1    3/2007

* cited by examiner

*Primary Examiner* — John Pezzlo
(74) *Attorney, Agent, or Firm* — McKenna Long & Aldridge LLP

(57) ABSTRACT

A method and apparatus of composing an uplink control channel in a wireless communication system is provided. Uplink radio resources including a plurality of symbols and a plurality of subcarriers is divided into a plurality of Feedback Mini-Tiles (FMTs) each having two consecutive subcarriers. Reordering FMTs (RFMTs) is selected from the plurality of FMTs. And a feedback channel is composed using the plurality of consecutive RFMTs.

11 Claims, 10 Drawing Sheets

FIG. 8

HMTs

| 0 | 1 | 2 |
|---|---|---|
| 3 | 4 | 5 |
| 6 | 7 | 8 |

| 9  | 10 | 11 |
|----|----|----|
| 12 | 13 | 14 |
| 15 | 16 | 17 |

⋮

RHMTs

| 0 | 4 | 8 |
|---|---|---|
| 0 | 4 | 8 |
| 1 | 5 | 6 |
| 1 | 5 | 6 |
| 2 | 3 | 7 |
| 2 | 3 | 7 |

⋮

METHOD AND APPARATUS OF COMPOSING UPLINK CONTROL CHANNEL IN WIRELESS COMMUNICATION SYSTEM

CROSS-REFERENCE TO RELATED APPLICATIONS

This application claims the benefit of priority of U.S. Provisional application No. 61/150,306 filed on Feb. 5, 2009, U.S. Provisional application No. 61/151,524 filed on Feb. 11, 2009, and Korean Patent application No. 10-2009-0074630 filed on Aug. 13, 2009, all of which are incorporated by reference in their entirety herein.

BACKGROUND OF THE INVENTION

1. Field of the Invention

The present invention relates to wireless communication, and more particularly, to a method and apparatus of composing an uplink control channel in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

One of the systems which are being taken into consideration in the next-generation wireless communication system is an Orthogonal Frequency Division Multiplexing (hereinafter referred to as OFDM) system capable of attenuating an Inter-Symbol Interference (ISI) effect with low complexity. The OFDM system transforms serial input data symbols into N parallel data symbols and transmits the N data symbols on respective N subcarriers. The N subcarriers maintain orthogonality in the frequency domain. The orthogonal channels experience independent frequency selective fading, and the interval between transmitted symbols is lengthened, thereby being capable of minimizing the ISI effect. Orthogonal Frequency Division Multiple Access (hereinafter referred to as OFDMA) refers to a multi-access method of realizing multi-access by independently providing users with some of available subcarriers in a system using OFDM as a modulation method. In the OFDMA method, frequency resources called subcarriers are provided to each user and are independently provided to a number of the users. Accordingly, the frequency resources provided to a number of the users, in general, do not overlap with each other. Consequently, the frequency resources are exclusively allocated to the respective users.

In the OFDMA system, the frequency diversity for a number of users can be obtained through frequency selective scheduling, and subcarriers can be allocated in various manners according to a permutation method for the subcarriers. Further, the efficiency of a space domain can be increased through a space multiplexing scheme using multiple antennas.

To obtain the frequency diversity when transmitting an uplink control signal, there is a need for a method of efficiently composing uplink control channels.

SUMMARY OF THE INVENTION

It is, therefore, an object of the present invention to provide a method and apparatus of composing an uplink control channel in a wireless communication system.

In an aspect, a method of composing an uplink control channel in a wireless communication system is provided. The method include dividing uplink radio resources, including a plurality of symbols and a plurality of subcarriers, into a plurality of Feedback Mini-Tiles (FMTs) each having two consecutive subcarriers, selecting Reordering FMTs (RFMTs) from the plurality of FMTs, and composing a feedback channel using the plurality of consecutive RFMTs. The method may further include dividing each of the RFMTs, composing the feedback channel, into a plurality of HARQ mini-tiles (HMTs), selecting Reordering HARQ Mini-Tiles (RHMTs) from the plurality of HMTs, and composing an HARQ feedback channel using a plurality of the consecutive RHMTSs.

In another aspect, a transmitter in a wireless communication system is provided. The transmitter include a Radio Frequency (RF) unit configured to transmit or receive a radio signal, and a processor coupled to the RF unit and configured to divide uplink radio resources, including a plurality of symbols and a plurality of subcarriers, into a plurality of Feedback Mini-Tiles (FMTs) each having two consecutive subcarriers, select Reordering FMTs (RFMTs) from the plurality of FMTs, and compose a feedback channel using the plurality of consecutive RFMTs. The processor may further configure to divide each of the RFMTs, composing the feedback channel, into a plurality of HARQ mini-tiles (HMTs), select Reordering HARQ Mini-Tiles (RHMTs) from the plurality of HMTs, and compose an HARQ feedback channel using a plurality of the consecutive RHMTSs.

BRIEF DESCRIPTION OF THE DRAWINGS

FIG. 8 is a diagram showing an example of composing an HARQ feedback channel according to the proposed method of the present invention.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
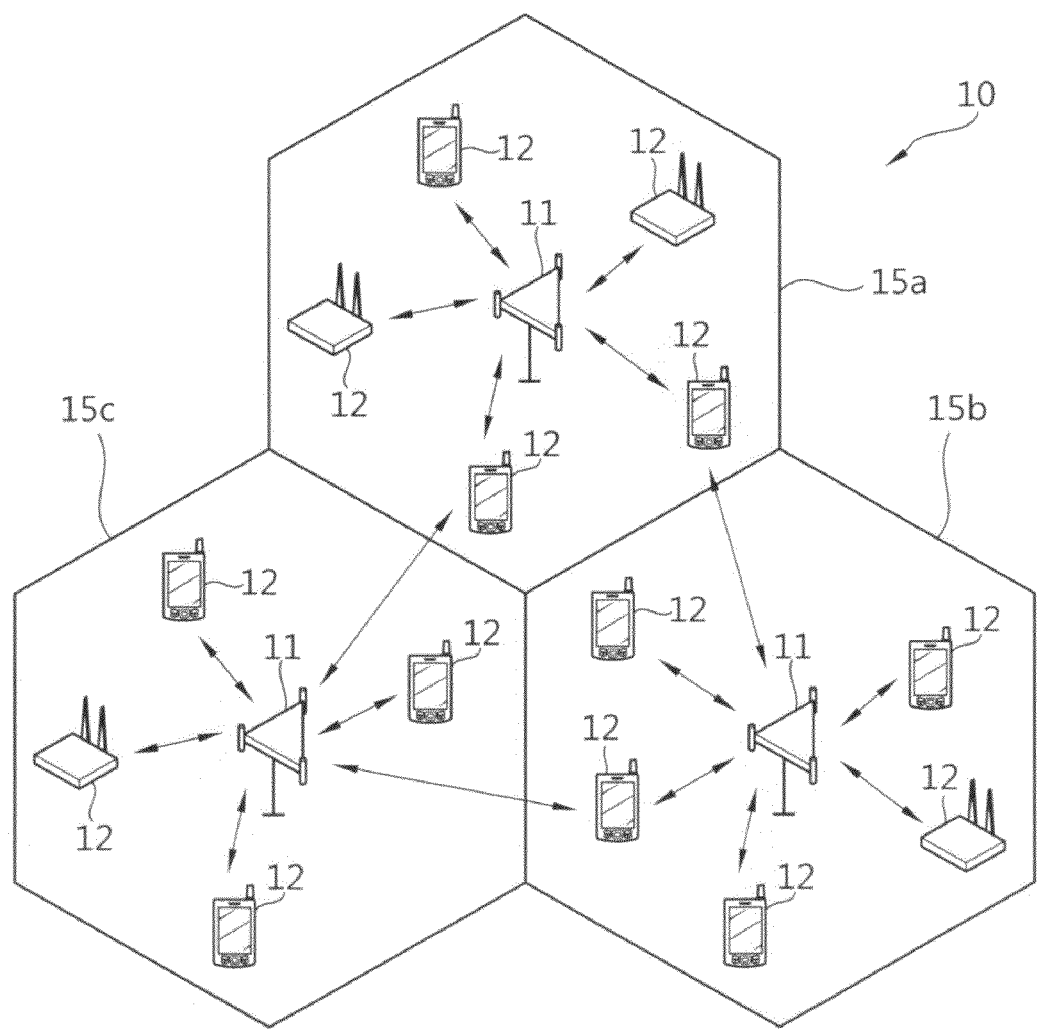
FIG. 1 is a diagram showing a wireless communication system.

FIG. 1 shows a wireless communication system.

The wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
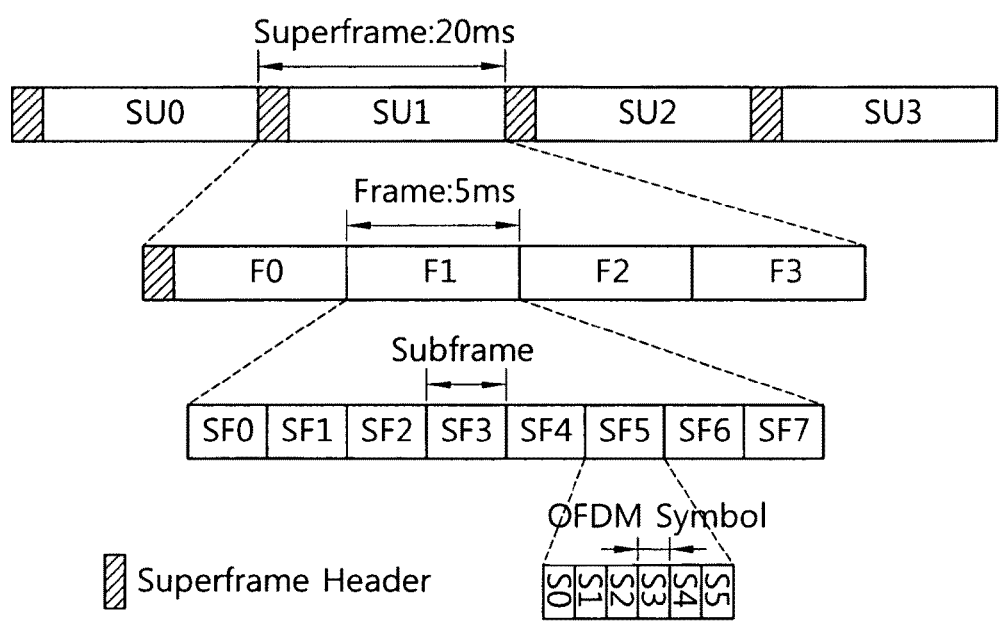
FIG. 2 is a diagram showing an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed resource unit (DRU) may be used to obtain a frequency diversity gain. The DRU includes a distributed subcarrier group in one frequency partition. The DRU has the same size as the PRU. One subcarrier is a basic unit of constituting the DRU. A distributed logical resource unit (DLRU) can be obtained by performing subcarrier permutation on the DRU.

A contiguous resource unit (CRU) may be used to obtain a frequency selective scheduling gain. The CRU includes a localized subcarrier group. The CRU has the same size as the PRU. A contiguous logical resource unit (CLRU) can be obtained by directly mapping the CRU.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Examples of the uplink control channel used in the IEEE 802.16m system include a fast feedback channel (FFBCH), a hybrid automatic repeat request (HARQ) feedback control channel (HFBCH), a sounding channel, a ranging channel, a bandwidth request channel (BRCH), etc. The FFBCH carries a feedback of CQI and/or MIMO information, and is classified into two types, i.e., a primary fast feedback channel (PFBCH) and a secondary fast feedback channel (SFBCH). The PFBCH carries 4 to 6-bit information, and provides a wideband CQI and/or a MIMO feedback. The SFBCH carries 7 to 24-bit information, and provides a narrowband CQI and/or a MIMO feedback. The SFBCH can support a larger number of control information bits by using a high code rate. The PFBCH supports non-coherent detection not using a reference signal. The SFBCH supports coherent detection using the reference signal.

The FFBCH may be assigned to a predetermined location defined in a broadcast message. The FFBCH may be assigned periodically to an MS. Feedback information of a plurality of MSs may be transmitted through the FFBCH by performing multiplexing according to time division multiplexing (TDM), frequency division multiplexing (FDM), and code division multiplexing (CDM). The FFBCH through which an ACK/NACK signal is transmitted in response to data to which an HARQ scheme is applied may start at a pre-defined offset from data transmission.

The BRCH is a channel requesting radio resources for transmitting uplink data or a control signal which will be transmitted by a mobile station. The HARQ feedback channel is a channel for transmitting ACK/NACK signals in response to data transmission. The FFBCH, the BRCH, the HARQ feedback channel, etc. can be placed anywhere in an uplink subframe or frame.

Figure 3:
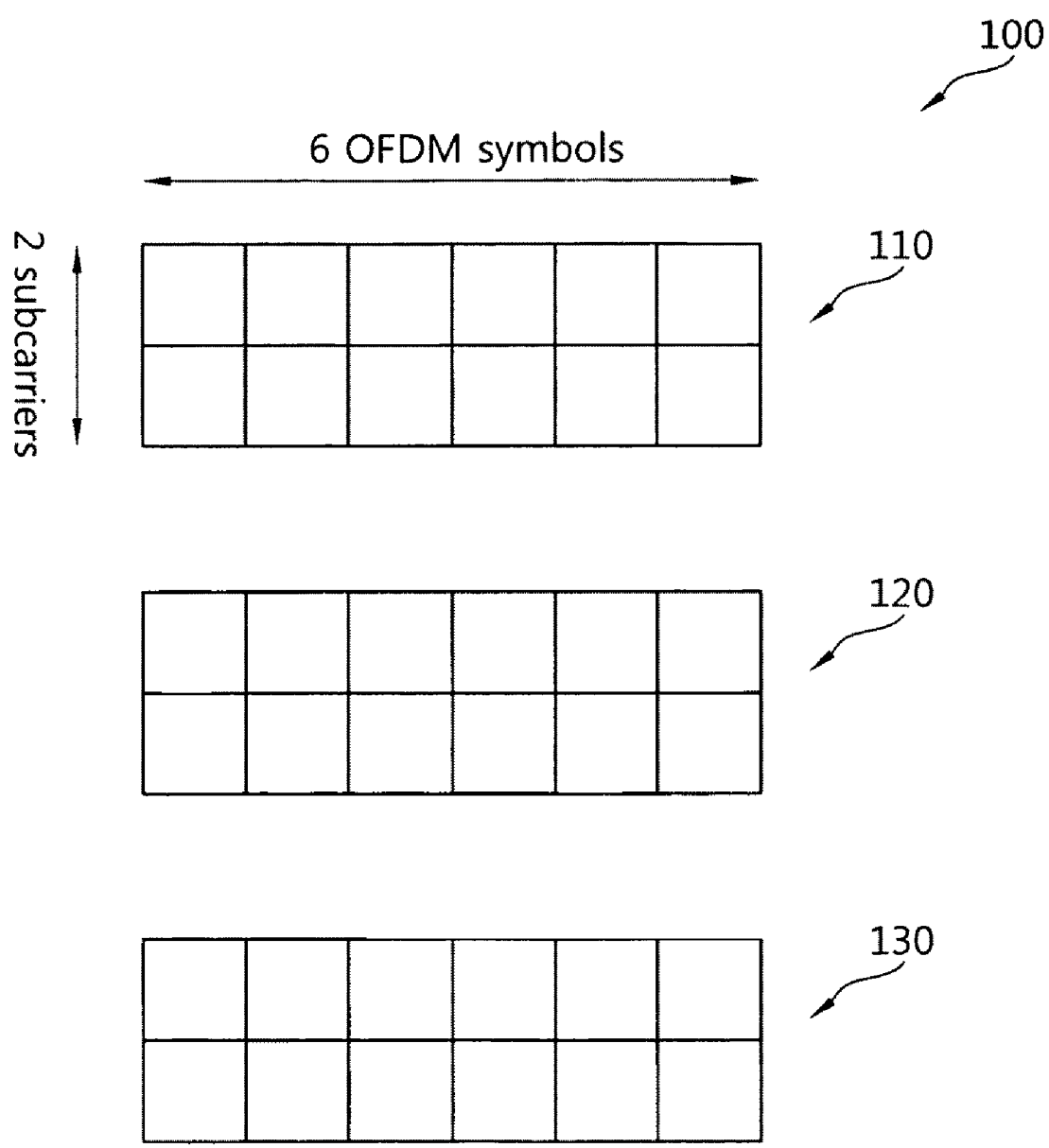
FIG. 3 is a diagram showing an example of a resource unit used in an uplink control channel.

FIG. 3 shows an example of a resource unit used for an uplink control channel in an IEEE 802.16m system. A resource unit 100 is a resource allocation unit used for transmission of an uplink control channel, and is also referred to as a tile. The tile 100 may be a physical resource allocation unit or a logical resource allocation unit. The control channel includes at least one tile 100, and the tile 100 consists of at least one frequency-domain subcarrier over at least one time-domain OFDM symbol. The tile 100 denotes an aggregation of a plurality of subcarriers contiguous along a time domain and a frequency domain. The tile 100 includes a plurality of data subcarriers and/or pilot subcarriers. A sequence of a control signal may be mapped to the data subcarrier, and a pilot for channel estimation may be mapped to the pilot subcarrier.

The tile 100 includes three mini units 110, 120, and 130. The mini unit is also referred to as a mini tile. The tile 100 may consist of a plurality of mini tiles. The mini tile may consist of at least one frequency-domain subcarrier over at least one time-domain OFDM symbol. Each of the mini tiles 110, 120, and 130 includes two contiguous subcarriers throughout 6 OFDM symbols. The mini tiles 110, 120, and 130 included in the tile 100 may not be contiguous to one another in the frequency domain. This implies that at least one mini tile of another tile may be located between the $1^{st}$ mini tile 110 and the $2^{nd}$ mini tile 120 and/or between the $2^{nd}$ mini tile 120 and the $3^{rd}$ mini tile 130. Frequency diversity can be obtained by locating the mini tiles 110, 120, and 130 included in the tile 100 in a distributive manner.

The number of time-domain OFDM symbols and/or the number of frequency-domain subcarriers included in the mini tile are for exemplary purposes only, and thus the present invention is not limited thereto. The mini tile may include a plurality of subcarriers throughout a plurality of OFDM symbols. The number of OFDM symbols included in the mini tile may differ according to the number of OFDM symbols included in a subframe. For example, if the number of OFDM symbols included in one subframe is 6, the number of OFDM symbols included in a mini tile may be 6.

The OFDM symbol denotes a duration in the time domain, and is not necessarily limited to an OFDM/OFDMA-based system. The OFDM symbol may also referred to as other terms such as a symbol duration. Technical features of the present invention are not limited to a specific multiple access scheme by the term of the OFDM symbol. In addition, the subcarrier denotes an allocation unit in the frequency domain. Although one subcarrier is used for this unit herein, a subcarrier set unit may be used.

The resource unit of FIG. 3 can be used as the resource unit of a feedback channel. That is, the feedback channel can include three mini-tiles, each having a 2×6 size. Further, the feedback channel can be composed by allocating DRUs from among logical resources. One DRU can include three distributed tiles, each having a 6×6 size. The tile can be classified into three neighbor mini-tiles, each having a 2×6 size. The mini-tile can be called a Feedback Mini-Tile (FMT) in that it is a resource unit used in a feedback channel.

Meanwhile, the three FMTs composing the feedback channel need to be distributed on the frequency domain in order to obtain the frequency diversity. Accordingly, FMTs within one tile, distributed on the DRU, cannot be allocated as the resources of a feedback channel, but the feedback channel has to be composed by combining FMTs within different tiles. In other words, feedback channels have to be allocated by changing the sequence of the FMTs within the DRU.

Methods of composing an uplink control channel according to some embodiments of the present invention are described below.

Figure 4:
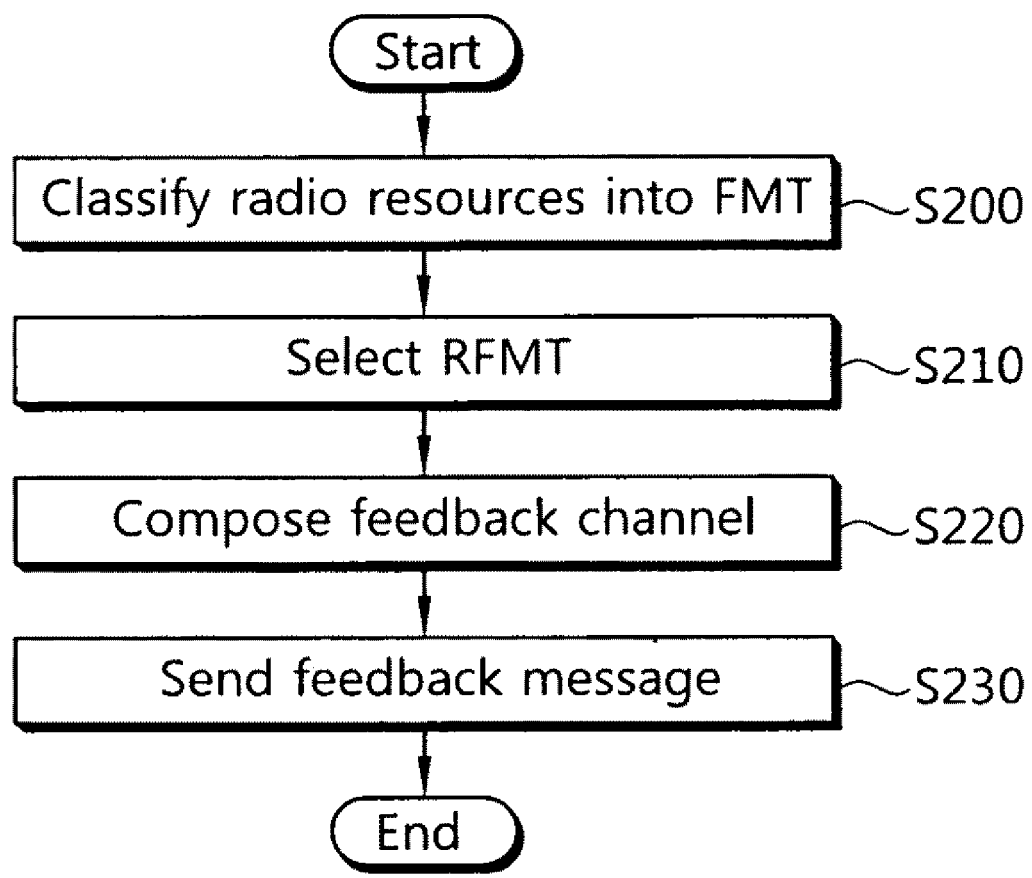
FIG. 4 is a diagram showing an example of a method of composing an uplink control channel according to an embodiment of the present invention.

FIG. 4 is a diagram showing a method of composing an uplink control channel according to an embodiment of the present invention.

At step S200, uplink radio resources are divided into a plurality of FMTs. The uplink radio resources can include at least one DRU. One DRU includes three distributed tiles, each having a 6×6 size. The tile includes three neighbor FMTs, each having a 2×6 size. The FMTs can be sequentially indexed starting from the front of the radio resources.

At step S210, Reordering FMTs (RFMTs) are selected from the plurality of FMTs. The RFMT refers to an FMT which is obtained by changing an index of the indexed FMT and then indexing the FMT again.

At step S220, a feedback channel is composed using three neighbor RFMTs selected from among the RFMTs.

At step S230, a feedback message is transmitted through the composed feedback channel.

Figure 5:
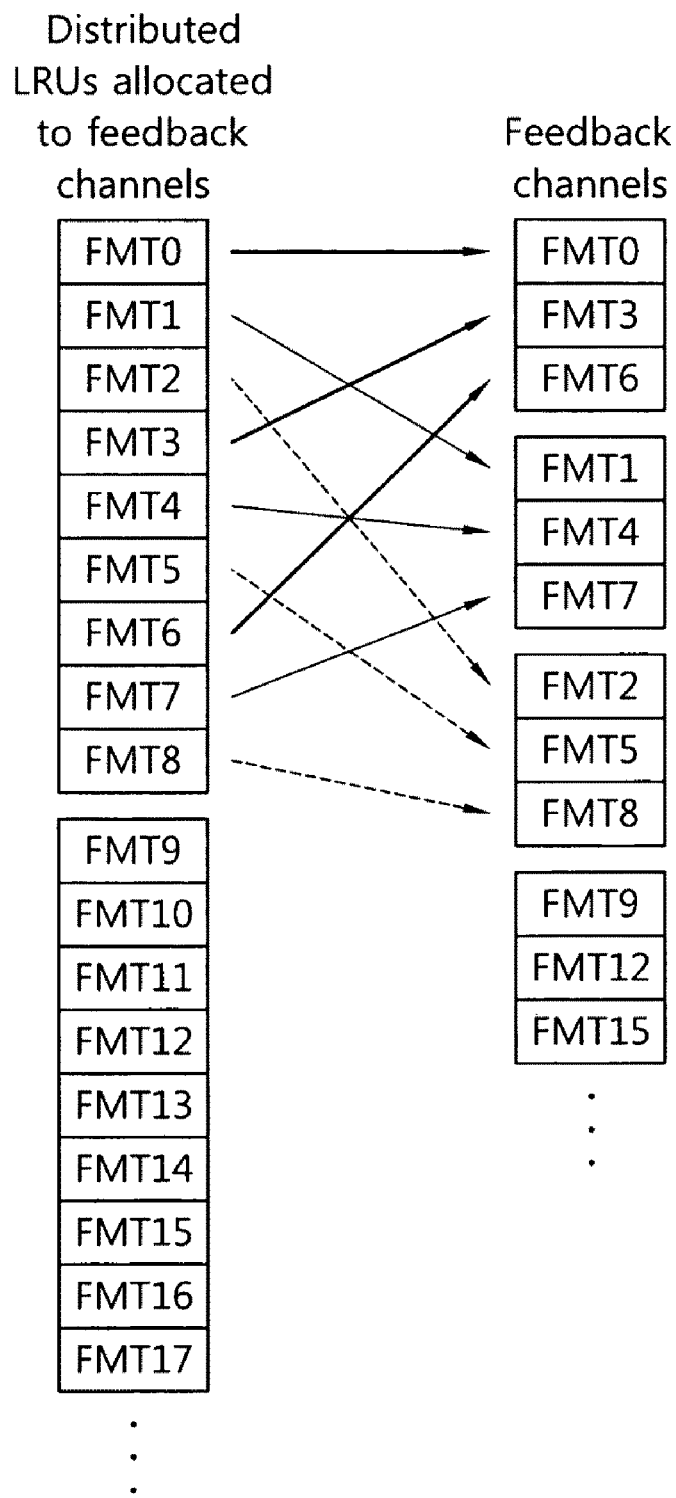
FIG. 5 is a diagram showing an example of composing a feedback channel according to the proposed method of the present invention.

FIG. 5 is a diagram showing an example of composing a feedback channel according to the proposed method of the present invention. The present embodiment can be used to compose a feedback channel of Mzone mode using only the 802.16m system. RFMTs constituting the feedback channel can be determined according to Equation 1 below.

$$RFMT(s, n) = 9 \times \left\lfloor \frac{s}{3} \right\rfloor + \text{mod}(s, 3) + 3 \times n \qquad \text{[Equation 1]}$$

In Equation 1, RFMT(s,n) (where n is one of 0, 1, and 2) indicates an $n^{th}$ FMT of an $s^{th}$ feedback channel selected from among a plurality of feedback channels.

$$\left\lfloor \frac{s}{3} \right\rfloor$$

indicates a maximum integer smaller than or equal to a number which is obtained by dividing 's' by 3. mod(s,3) indicates the remainder which is obtained by dividing 's' by 3. That is, one feedback channel can be composed by a combination of three FMTs which are respectively selected from three distributed tiles, constituting one DRU, according to Equation 1.

Figure 6:
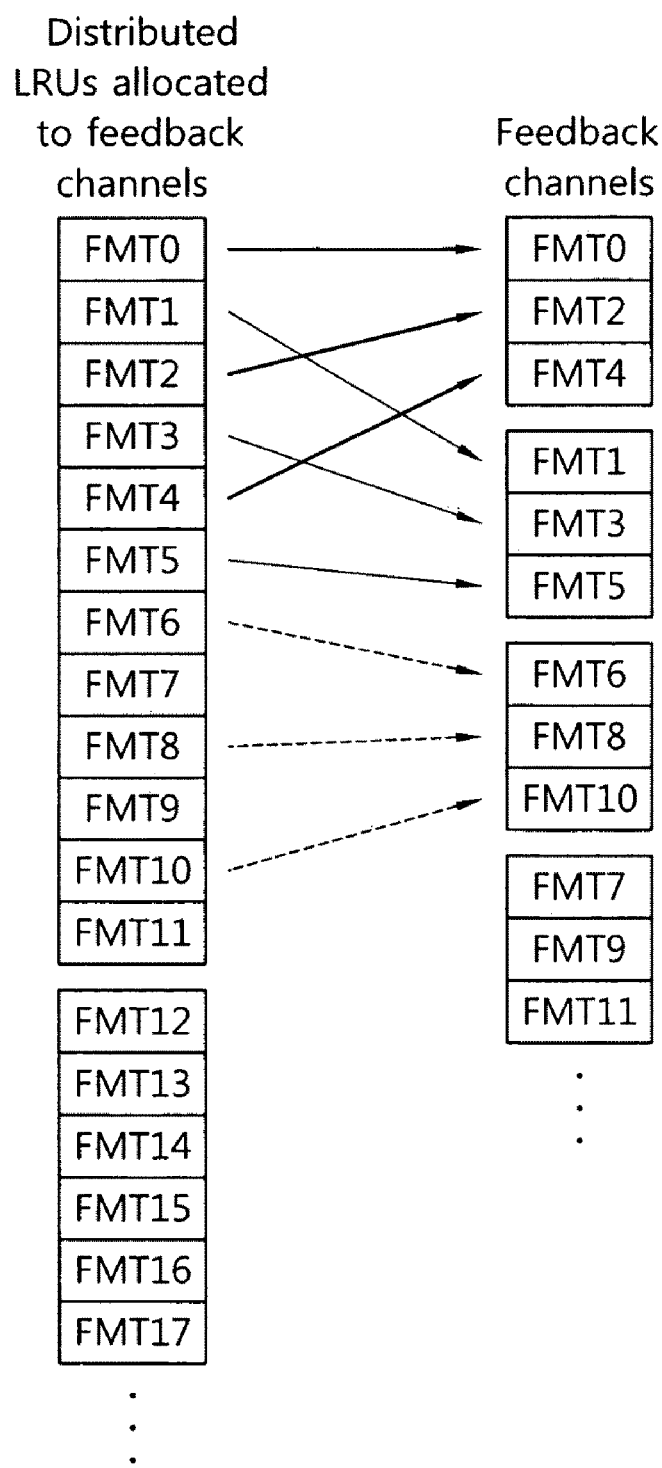
FIG. 6 is a diagram showing another example of composing a feedback channel according to the proposed method of the present invention.

FIG. 6 is a diagram showing another example of composing a feedback channel according to the proposed method of the present invention. The present embodiment can be used to compose a feedback channel of Lzone mode in which a FDM method is applied to the 802.16m system and the 802.16e system and Partial Usage of Subchannels (PUSC) are used. RFMTs constituting feedback channels can be determined according to Equation 2 below.

$$RFMT(s, n) = 6 \times \left\lfloor \frac{s}{2} \right\rfloor + \text{mod}(s, 2) + 2 \times n \qquad \text{[Equation 2]}$$

In Equation 2, RFMT(s,n) (where n is one of 0, 1, and 2) indicates an $n^{th}$ FMT of an $s^{th}$ feedback channel selected from among a plurality of feedback channels.

$$\left\lfloor \frac{s}{2} \right\rfloor$$

indicates a maximum integer smaller than or equal to a number which is obtained by dividing 's' by 2. mod(s,2) indicates the remainder which is obtained by dividing 's' by 2. That is, one feedback channel can be composed by a combination of three FMTs which are selected from six distributed tiles, constituting one DRU, according to Equation 2.

Meanwhile, a hybrid automatic repeat request (HARQ) feedback channel for sending an HARQ can be sent by allocating FMTs. One feedback channel can be used to transmit six HARQ feedback channels, and radio resources of feedback channels composed according to the proposed method can be used. HARQ feedback channels can follow a bandwidth request channel on the radio resources.

Figure 7:
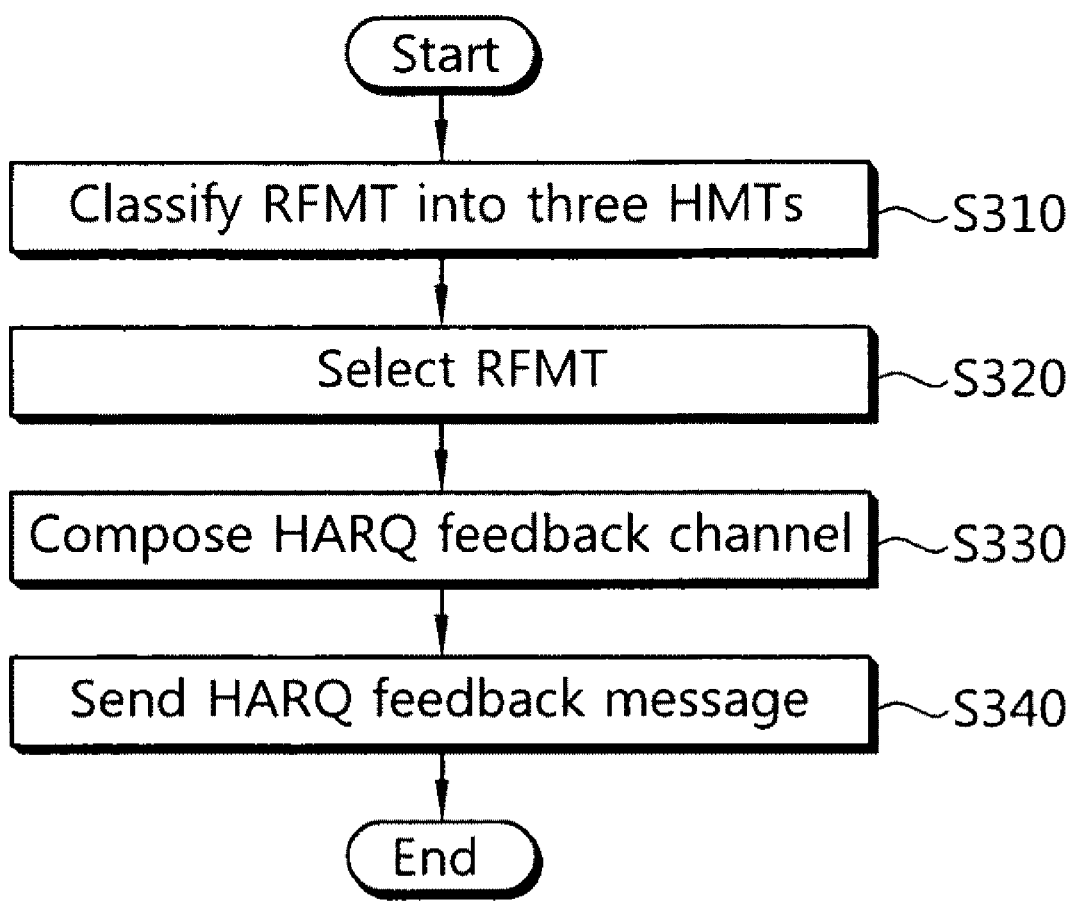
FIG. 7 is a diagram showing another example of a method of composing an uplink control channel according to an embodiment of the present invention.

FIG. 7 is a diagram showing another example of a method of composing an uplink control channel according to an embodiment of the present invention.

At step S310, A feedback channel composed of three RFMTs is divided into three HARQ mini-tiles. Since one RFMT has a 2×6 size, one HARQ mini-tile has a 2×2 size. The HARQ mini-tile can be sequentially indexed starting from the front of the radio resources or may be indexed every RFMT.

At step S320, Reordering HARQ mini-tiles (RHMTs) are selected from the plurality of HARQ mini-tiles. The RHMT refers to an FMT which is obtained by changing an index of the indexed HARQ mini-tile and then indexing the HARQ mini-tile again.

At step S330, an HARQ feedback channel is composed using three neighbor reordering HARQ mini-tiles selected from among the reordering HARQ mini-tiles.

At step S340, an HARQ feedback message is sent through the composed HARQ feedback channel.

FIG. 8 is a diagram showing an example of composing an HARQ feedback channel according to the proposed method of the present invention. The present embodiment can be used in the case in which two HARQ feedback channels are subject to Code Division Multiplexing (CDM) within a 2×2-sized HARQ mini-tile. Reordering HARQ mini-tiles constituting the HARQ feedback channel can be determined according to Equation 3 below.

$$HMT(k, m) = 9 \times \left\lfloor \frac{k'}{3} \right\rfloor + \mod(k' + m, 3) + 3 \times m \quad \text{[Equation 3]}$$

In Equation 3, HMT(k,m) (where m is one of 0, 1, and 2) indicates an $m^{th}$ HARQ mini-tile of a $k^{th}$ HARQ feedback channel selected from among a plurality of HARQ feedback channels.

$$k' = \left\lfloor \frac{k}{2} \right\rfloor, \text{ and } \left\lfloor \frac{k}{2} \right\rfloor$$

indicates a maximum integer smaller than or equal to the quotient which is obtained by dividing 'k' by 2.

$$\left\lfloor \frac{k'}{3} \right\rfloor$$

indicates a maximum integer smaller than or equal to the quotient which is obtained by dividing k' by 3. mod(k'+m,3) indicates the remainder which is obtained by dividing (k'+m) by 3. That is, one HARQ feedback channel can be composed by a combination of three HARQ feedback mini-tiles which are selected from reordering feedback mini-tiles, allocated for HARQ feedback, according to Equation 3.

Figure 9:
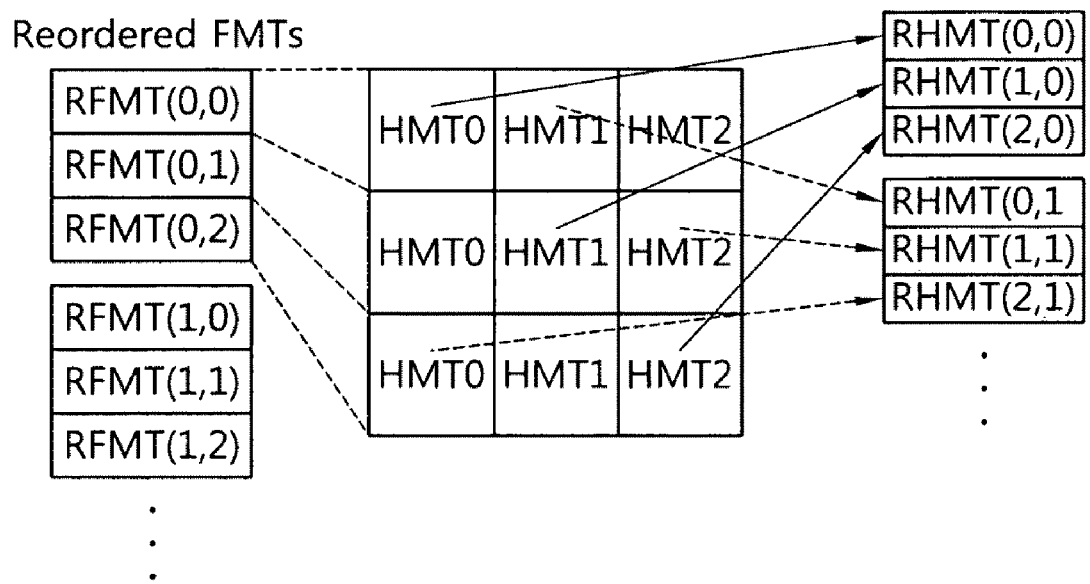
FIG. 9 is a diagram showing another example of composing an HARQ feedback channel according to the proposed method of the present invention.

FIG. 9 is a diagram showing another example of composing an HARQ feedback channel according to the proposed method of the present invention. Reordering HARQ mini-tiles constituting the HARQ feedback channel can be determined according to Equation 4 below.

$$RHMT(n,k) = (n+k) \mod M \quad \text{[Equation 4]}$$

In Equation 4, RHMT(n,k) (where n is one of 0, 1, and 2) indicates a $n^{th}$ HARQ mini-tile of an $k^{th}$ HARQ feedback channel selected from among a plurality of HARQ feedback channels. (n+k) mod M indicates the remainder which is obtained by dividing (n+k) by M. M indicates the number of HARQ feedback channels included in one feedback channel. In other words, one HARQ feedback channel can be composed by selecting one HARQ mini-tile from each of RFMTs in three RFMT constituting one feedback channel.

Meanwhile, if the HARQ feedback channel of each user equipment is subject to CDM within an HARQ mini-tile, the same HARQ mini-tile can be allocated to several user equipments. Accordingly, it is necessary to separately indicate CDM codes or the sequence thereof in the user equipments.

Figure 10:
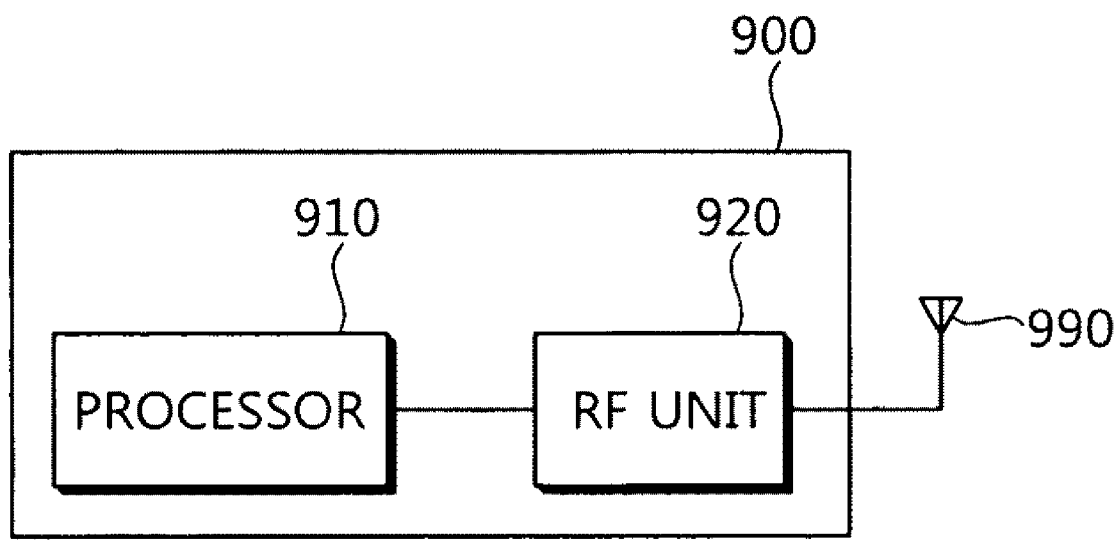
FIG. 10 is a block diagram of a user equipment in which embodiments of the present invention are implemented.

FIG. 10 is a block diagram of a user equipment in which the embodiments of the present invention are implemented.

The user equipment 900 includes a processor 910 and an Radio Frequency (RF) unit 920. The processor 910 is implemented to perform the proposed functions, processes, and/or methods.

The processor 910 divides uplink radio resources, including a plurality of symbols and a plurality of subcarriers, into a plurality of FMTs each having two consecutive subcarriers, selects Reordering RFMTs from the plurality of FMTs, and composes feedback channels using the plurality of consecutive RFMTs. The RF unit 920 is coupled to the processor 910 and is configured to transmit and/or receive radio signals.

The processor 910 can include an Application-Specific Integrated Circuit (ASIC), a specific chipset, a logic circuit and/or a data processor. The RF unit 920 can include a baseband circuit for processing radio signals. In the case in which the embodiments are implemented in software, the above methods can be implemented using a module (e.g., process or function) for performing the above functions. The module can be executed by the processor 910.

According to the present invention, the frequency diversity can be obtained by composing a feedback channel using distributed radio resources.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of composing an uplink control channel in a wireless communication system, the method comprising:

dividing, by a transmitter, uplink radio resources, including a plurality of symbols and a plurality of subcarriers, into a plurality of Feedback Mini-Tiles (FMTs) each having two consecutive subcarriers;

selecting, by the transmitter, Reordering FMTs (RFMTs) from the plurality of FMTs; and composing, by the transmitter, a feedback channel using the plurality of consecutive RFMTs.

2. The method of claim 1, wherein the RFMTs are selected according to Equation below $$RFMT(s, n) = 9 \times \left\lfloor \frac{s}{3} \right\rfloor + \mod(s, 3) + 3 \times n$$

where RFMT(s,n) (where n is one of 0, 1, and 2) indicates an $n^{th}$ FMT of an $s^{th}$ feedback channel, $$\left\lfloor \frac{s}{3} \right\rfloor$$

indicates a maximum integer smaller than or equal to a quotient which is obtained by dividing 's' by 3, and mod(s,3) indicates a reminder which is obtained by dividing 's' by 3.

3. The method of claim 1, wherein the RFMTs are selected according to Equation below $$RFMT(s, n) = 6 \times \left\lfloor \frac{s}{2} \right\rfloor + \mathrm{mod}(s, 2) + 2 \times n$$

where RFMT(s,n) (where n is one of 0, 1, and 2) indicates an $n^{th}$ FMT of an $S^{th}$ feedback channel, $$\left\lfloor \frac{s}{2} \right\rfloor$$

indicates a maximum integer smaller than or equal to a number which is obtained by dividing 's' by 2, and mod(s,2) indicates a reminder which is obtained by dividing 's' by 2.

4. The method of claim 1, further comprising:
dividing each of the RFMTs, composing the feedback channel, into a plurality of HARQ mini-tiles (HMTs);
selecting Reordering HARQ Mini-Tiles (RHMTs) from the plurality of HMTs; and
composing an HARQ feedback channel using a plurality of the consecutive RHMTSs.

5. The method of claim 4, wherein the RHMTs are selected according to Equation below $$HMT(k, m) = 9 \times \left\lfloor \frac{k'}{3} \right\rfloor + \mathrm{mod}(k' + m, 3) + 3 \times m$$

HMT(k,m) (where m is one of 0, 1, and 2) indicates an $m^{th}$ HARQ mini-tile of a $k^{th}$ HARQ feedback channel, $$k' = \left\lfloor \frac{k}{2} \right\rfloor, \left\lfloor \frac{k}{2} \right\rfloor$$

indicates a maximum integer smaller than or equal to a quotient which is obtained by dividing 'k' by 2, and $$\left\lfloor \frac{k'}{3} \right\rfloor$$

indicates a maximum integer smaller than or equal to a quotient which is obtained by dividing k' by 3.

6. The method of claim 4, wherein the RHMTs are selected according to Equation below RHMT(n,k)=(n+k) mod M where RHMT(n,k) (where n is one of 0, 1, and 2) indicates a $n^{th}$ HARQ mini-tile of an $k^{th}$ HARQ feedback channel, and M indicates a number of HARQ feedback channels included in the feedback channel.

7. A transmitter in a wireless communication system, the transmitter comprising:
a Radio Frequency (RF) unit configured to transmit or receive a radio signal;
a processor coupled to the RF unit and configured to:
divide uplink radio resources, including a plurality of symbols and a plurality of subcarriers, into a plurality of Feedback Mini-Tiles (FMTs) each having two consecutive subcarriers,
select Reordering FMTs (RFMTs) from the plurality of FMTs, and
compose a feedback channel using the plurality of consecutive RFMTs.

8. The transmitter of claim 7, wherein the RFMTs are selected according to Equation below $$RFMT(s, n) = 9 \times \left\lfloor \frac{s}{3} \right\rfloor + \mathrm{mod}(s, 3) + 3 \times n$$

where RFMT(s,n) (where n is one of 0, 1, and 2) indicates an $n^{th}$ FMT of an $s^{th}$ feedback channel, $$\left\lfloor \frac{s}{3} \right\rfloor$$

indicates a maximum integer smaller than or equal to a quotient which is obtained by dividing 's' by 3, and mod(s,3) indicates a reminder which is obtained by dividing 's' by 3.

9. The transmitter of claim 7, wherein the RFMTs are selected according to Equation below $$RFMT(s, n) = 6 \times \left\lfloor \frac{s}{2} \right\rfloor + \mathrm{mod}(s, 2) + 2 \times n$$

where RFMT(s,n) (where n is one of 0, 1, and 2) indicates an $n^{th}$ FMT of an $s^{th}$ feedback channel, $$\left\lfloor \frac{s}{2} \right\rfloor$$

indicates a maximum integer smaller than or equal to a number which is obtained by dividing 's' by 2, and mod(s,2) indicates a reminder which is obtained by dividing 's' by 2.

10. The transmitter of claim 7, further comprising:
dividing each of the RFMTs, composing the feedback channel, into a plurality of HARQ mini-tiles (HMTs);
selecting Reordering HARQ Mini-Tiles (RHMTs) from the plurality of HMTs; and
composing an HARQ feedback channel using a plurality of the consecutive RHMTSs.

11. The transmitter of claim 10, wherein the RHMTs are selected according to Equation below $$HMT(k, m) = 9 \times \left\lfloor \frac{k'}{3} \right\rfloor + \mathrm{mod}(k' + m, 3) + 3 \times m$$

HMT(k,m) (where m is one of 0, 1, and 2) indicates an $m^{th}$ HARQ mini-tile of a $k^{th}$ HARQ feedback channel, $$k' = \left\lfloor \frac{k}{2} \right\rfloor, \left\lfloor \frac{k}{2} \right\rfloor$$

indicates a maximum integer smaller than or equal to a quotient which is obtained by dividing 'k' by 2, and $$\left\lfloor \frac{k'}{3} \right\rfloor$$

indicates a maximum integer smaller than or equal to a quotient which is obtained by dividing k' by 3.

* * * * *